(12) United States Patent
Bag et al.

(10) Patent No.: US 7,797,650 B2
(45) Date of Patent: Sep. 14, 2010

(54) SYSTEM AND METHOD FOR TESTING SLB AND TLB CELLS DURING PROCESSOR DESIGN VERIFICATION AND VALIDATION

(75) Inventors: Sandip Bag, Karnataka (IN); Manoj Dusanapudi, Karnataka (IN); Sunil Suresh Hatti, Karnataka (IN); Shakti Kapoor, Austin, TX (US); Batchu Naga Venkata Satyanarayana, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/853,163

(22) Filed: Sep. 11, 2007

(65) Prior Publication Data

US 2009/0070632 A1  Mar. 12, 2009

(51) Int. Cl.
*G06F 17/50* (2006.01)
*G06F 9/44* (2006.01)
*G06F 13/10* (2006.01)

(52) U.S. Cl. ............... 716/4; 703/14; 703/20; 703/21; 703/22; 714/718

(58) Field of Classification Search ............ 716/4; 703/14, 20, 21, 22; 714/718
See application file for complete search history.

(56) References Cited

U.S. PATENT DOCUMENTS

| | | | | |
|---|---|---|---|---|
| 5,133,061 A | | 7/1992 | Melton et al. ............... | 711/128 |
| 5,216,672 A | * | 6/1993 | Tatosian et al. ............. | 714/718 |
| 5,426,750 A | * | 6/1995 | Becker et al. ............... | 711/207 |
| 5,469,443 A | * | 11/1995 | Saxena ....................... | 714/720 |
| 5,584,013 A | | 12/1996 | Cheong et al. .............. | 711/122 |
| 6,014,756 A | | 1/2000 | Dottling et al. ............... | 714/15 |
| 6,157,980 A | | 12/2000 | Arimilli et al. ................. | 711/3 |
| 6,609,216 B1 | * | 8/2003 | Almy et al. .................... | 714/25 |
| 6,865,501 B2 | | 3/2005 | Huisman et al. ............ | 702/117 |
| 6,950,771 B1 | * | 9/2005 | Fan et al. .................... | 702/117 |
| 6,968,428 B2 | * | 11/2005 | Maly et al. .................. | 711/128 |
| 2009/0070643 A1 | * | 3/2009 | Anvekar et al. ............. | 714/718 |

OTHER PUBLICATIONS

Office action for co-pending U.S. Appl. No. 11/853,154, mailed May 25, 2010, 10 pages.

* cited by examiner

*Primary Examiner*—Phallaka Kik
(74) *Attorney, Agent, or Firm*—VanLeeuwen & VanLeeuwen; Matthew B. Talpis

(57) ABSTRACT

A system and method for re-executing a test case and modifying the test case's effective addresses, effective segment identifiers (ESIDs), and virtual segment identifiers (VSIDs) in order to fully test a processor's SLB and TLB cells is presented. A test case generator generates a test case that includes an initial set of test case effective addresses, an initial set of ESIDs, and an initial set of VSIDs. The test case executor uses an effective address arithmetic function and a virtual address arithmetic function to modify the test case effective addresses, the ESIDs, and the VSIDs on each re-execution that, in turn, sets/unsets each bit within each SLB and TLB entry. In one embodiment, the invention described herein sequentially shifts segment lookaside buffer entries, whose ESIDs are in single bit increments, in order to fully test each ESID bit location within each SLB entry.

20 Claims, 9 Drawing Sheets

SYSTEM AND METHOD FOR TESTING SLB AND TLB CELLS DURING PROCESSOR DESIGN VERIFICATION AND VALIDATION

BACKGROUND OF THE INVENTION

1. Technical Field

The present invention relates to a system and method for efficiently testing segment lookaside buffer (SLB) and translation lookaside buffer (TLB) cells during processor design verification and validation. More particularly, the present invention relates to a system and method for re-executing a test case and modifying the test case's effective addresses, effective segment identifiers, and virtual segment identifiers in order to fully test each bit in a processor's SLB and TLB cells.

2. Description of the Related Art

Processor testing tools exist whose goal is to generate the most stressful test case for a processor. In theory, the generated test case should provide maximum test coverage and should be interesting enough to stress various timing scenarios on the processor. The whole technology of these tools sits in the logic of building these test cases.

Verifying and validating a processor using test cases typically includes three stages, which are 1) test case build stage, 2) test case execution stage, and 3) validation and verification stage. While building a virtual mode test case, a test case generator builds a segment lookaside buffer (SLB) and a translation lookaside buffer (TLB) for translating addresses. A challenge found is that existing art does not provide predictable coverage of the bits included in the SLB and the TLB. In addition, in order to set and unset each bit at least once in the SLB and TLB, an enormous number of translations in each entry is required, which requires new sets of test cases. Unfortunately, building the test cases is cumbersome, let alone difficult to ensure that each bit is set and unset in each TLB entry and each SLB entry at least once.

Furthermore, the SLB and the TLB have as many as 128 bits in each of many entries. Therefore, a large quantity of test cases, each with different translations, is required to cover each cell. Again, generating more test cases requires more time, which leaves less time available for testing the processor.

What is needed, therefore, is a system and method to efficiently test a processor's segment lookaside buffer and translation lookaside buffer.

SUMMARY

It has been discovered that the aforementioned challenges are resolved using a system and method for re-executing a test case and modifying the test case's effective addresses, effective segment identifiers (ESIDs), and virtual segment identifiers (VSIDs) in order to fully test a processor's SLB and TLB cells. A test case generator generates a test case that includes an initial set of test case effective addresses, an initial set of ESIDs, and an initial set of VSIDs. The ESIDs and VSIDs are used in a segment lookaside buffer (SLB) to translate from an effective address to a virtual address. The VSIDs are also used in a translation lookaside buffer (TLB) to translate virtual addresses to real addresses. The test case effective addresses are addresses that are obtained from base and index registers included in the test case instructions themselves, which a processor eventually translates to a real address using the SLB and TLB.

A scheduler schedules the test case using the initial set of test case effective addresses, the initial set of ESIDs, and the initial set of VSIDs, and provides the test case to a dispatcher. The dispatcher dispatches the test case to the processor. The processor executes the test case and provides hardware results to a comparator. In turn, the comparator matches the hardware results to known values, and provides a pass or fail result to the scheduler.

When the hardware results pass, the scheduler uses an effective address arithmetic function to modify the initial set of test case effective addresses, such as adding "1," to a test case base address register value, thus adding "1" to each test case effective address. Likewise, the effective address arithmetic function also adds "1" to each EISD in order for the modified test case effective addresses to correspond with the modified ESIDs in the SLB. In addition, the scheduler uses a virtual address arithmetic function to modify the initial set of VSIDs located in the SLB and TLB, such as adding "3" to each VSID in both the SLB and TLB.

Once the scheduler finishes modifying the test case effective addresses, the ESIDs, and the VSIDs, the scheduler sends the test case, which now includes different (second set) test case effective addresses, ESIDs, and VSIDs, to the dispatcher. The dispatcher dispatches the test case to the processor that executes the test case using the second set of test case effective addresses, ESIDs, and VSIDs, and sends hardware results to the results comparator.

The scheduler continues to generate, "n" number of times, different sets of test case effective addresses, ESIDs, and VSIDs, and include these sets in the test case which the processor subsequently executes in order to adequately test the processor's segment lookaside buffer (SLB) and translation lookaside buffer (TLB).

In one embodiment, the invention described herein sequentially shifts segment lookaside buffer (SLB) entries, whose ESIDs are in single bit increments, in order to fully test each ESID bit location within each SLB entry. In this embodiment, when the test case generator builds the SLB, the test case generator builds multiple SLB entries in such a way that each ESID bit position is set and unset at least once in any of the entries. The test case executor then executes the test case using the SLB during a first execution round. Next, in this embodiment, the test case executor's scheduler shifts each ESID/VSID pair down one entry. As a result, at least one ESID bit in each of the SLB entries is different from the first execution round. The test case executor then executes the test case using the modified SLB during a second execution round. In another embodiment, the scheduler pseudo-randomly shuffles the ESID/VSID pairs, all the while keeping the pair combination intact.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
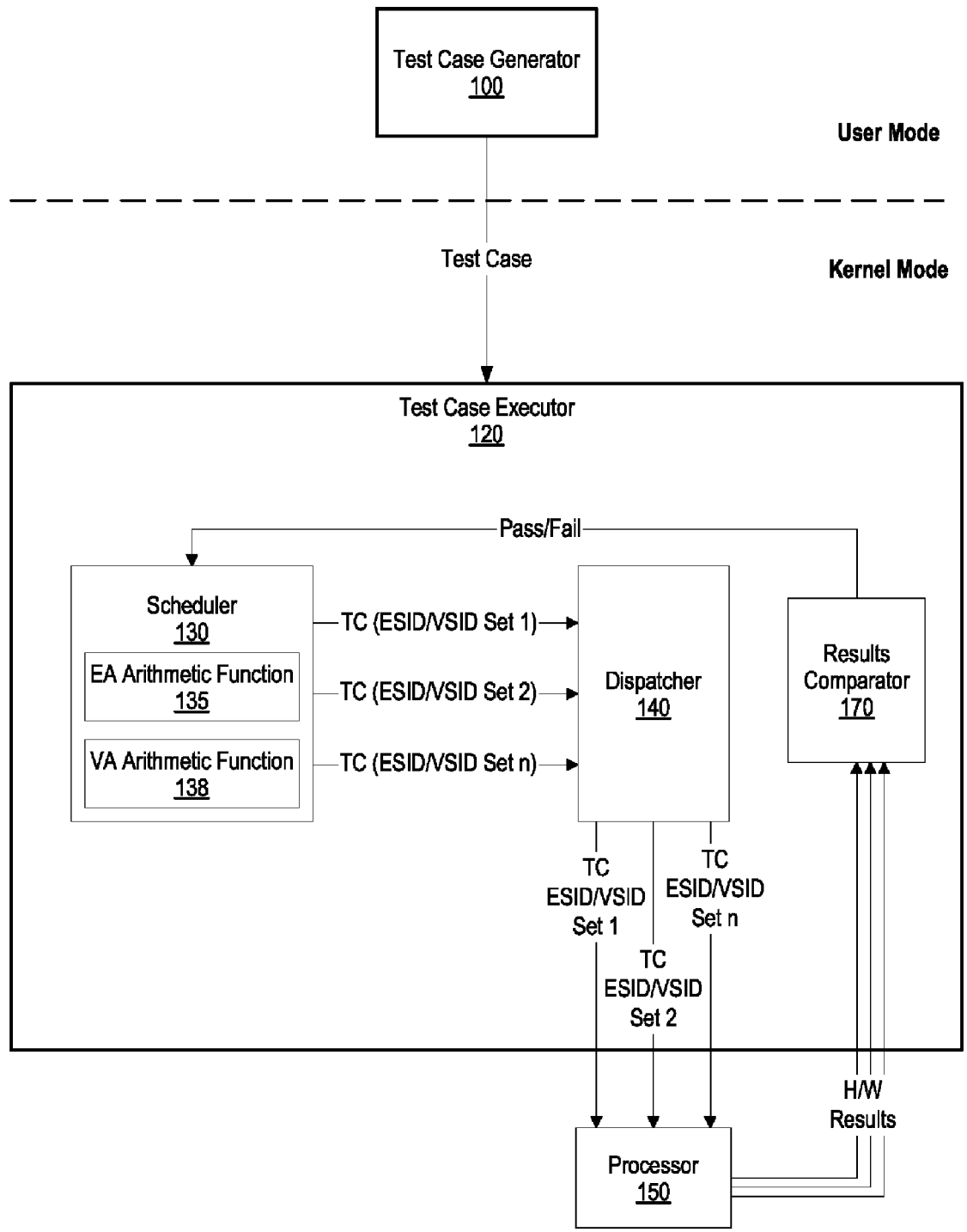
FIG. 1 is a diagram showing a test case executor re-executing a test case using different sets of test case effective addresses, different sets of effective segment identifiers (ES-IDs), and different sets of virtual segment identifiers (VSIDs)

FIG. 1 is a diagram showing a test case executor re-executing a test case using different sets of test case effective addresses, different sets of effective segment identifiers (ES-IDs), and different sets of virtual segment identifiers (VSIDs).

Test case generator 100 operates in a user mode, and generates a test case that it provides to test case executor 120, which operates in a kernel mode. The test case includes an initial set of test case effective addresses, an initial set of ESIDs, and an initial set of VSIDs. The ESIDs and VSIDs are used in a segment lookaside buffer (SLB) to translate from an effective address to a virtual address. The VSIDs are also used in a translation lookaside buffer (TLB) to translate virtual addresses to real addresses. The test case effective addresses are addresses that are obtained from the base and index registers included in the test case instructions themselves, which a processor eventually translates to a real address using the SLB and TLB.

Scheduler 130 schedules the test case using the initial set of test case effective addresses, the initial set of ESIDs, and the initial set of VSIDS, and provides the test case to dispatcher 140. In turn, dispatcher 140 dispatches the test case to processor 150. Processor 150 executes the test case and provides hardware results to comparator 170. In turn, results comparator 170 matches the hardware results to known values, and provides a pass or fail result to scheduler 130.

When the hardware results pass, scheduler 130 uses effective address (EA) arithmetic function 135 to modify the initial set of test case effective addresses and the initial set of ESIDs in the same manner. For example, EA arithmetic function 135 may add "1" to a test case base address register value, thus adding "1" to each test case effective address. Likewise, EA arithmetic function 135 also adds "1" to each EISD in order for the modified test case effective addresses to correspond with the modified ESIDs in the SLB. In addition, scheduler 130 uses virtual address (VA) arithmetic function 138 to modify the initial set of VSIDs located in the SLB and TLB. For example, VA arithmetic function 138 may add "3" to each VSID in both the SLB and TLB (see FIGS. 2A, 2B, and corresponding text for further details).

Once scheduler 130 finishes modifying the test case effective addresses, the ESIDs, and the VSIDs, scheduler 130 sends the test case, which now includes different (second set) test case effective addresses, ESIDs, and VSIDs, to dispatcher 140. Dispatcher 140 dispatches the test case to processor 150 that executes the test case using the second set of test case effective addresses, ESIDs, and VSIDs, and sends hardware results to results comparator 170.

Scheduler 130 continues to generate, "n" number of times, different sets of test case effective addresses, ESIDs, and VSIDs, and include these in the test case which processor 150 subsequently executes in order to adequately test processor 150's segment lookaside buffer (SLB) and translation lookaside buffer (TLB).

Figure 2A:
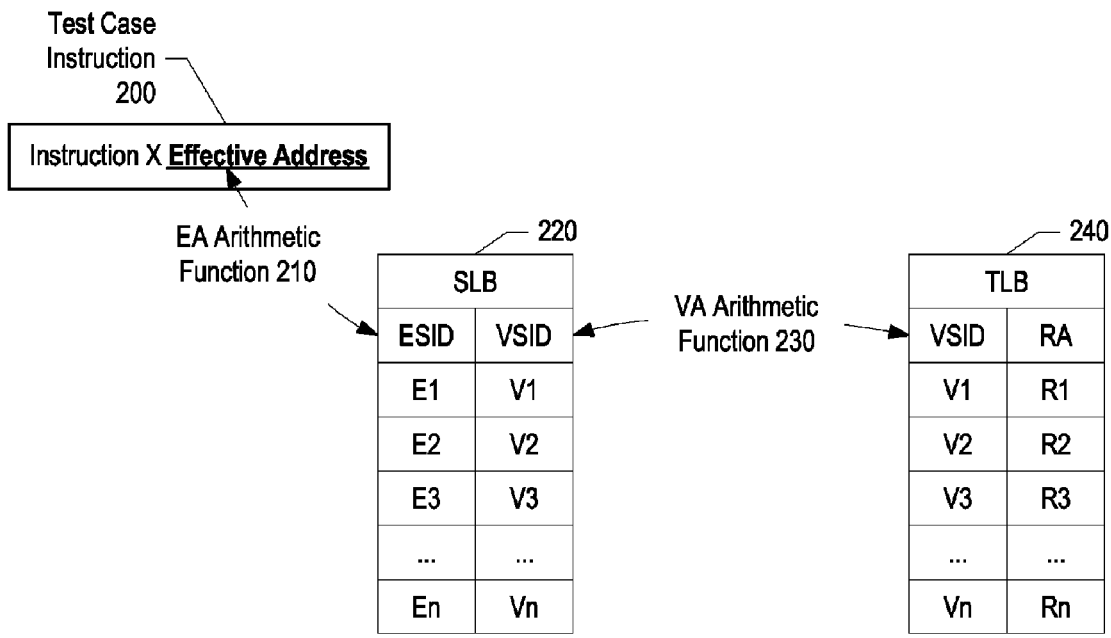
FIG. 2A is a diagram showing an effective address (EA) arithmetic function and a virtual address (VA) arithmetic function modifying test case effective addresses, ESIDs, and VSIDs.

FIG. 2A is a diagram showing an effective address (EA) arithmetic function and a virtual address (VA) arithmetic function modifying test case effective addresses, ESIDs, and VSIDs. EA arithmetic function 210 modifies test case instruction 200's effective address by modifying base address registers (e.g., add "1") instead of modifying test case instruction 200's address offset value. In addition, EA arithmetic function 210 modifies each ESID located in SLB 220 by the same amount.

Likewise, VA arithmetic function 230 modifies SLB 220's VSIDs by a particular amount (e.g., add "2"), and also modifies TLB 240's VSIDs by the same amount.

Figure 2B:
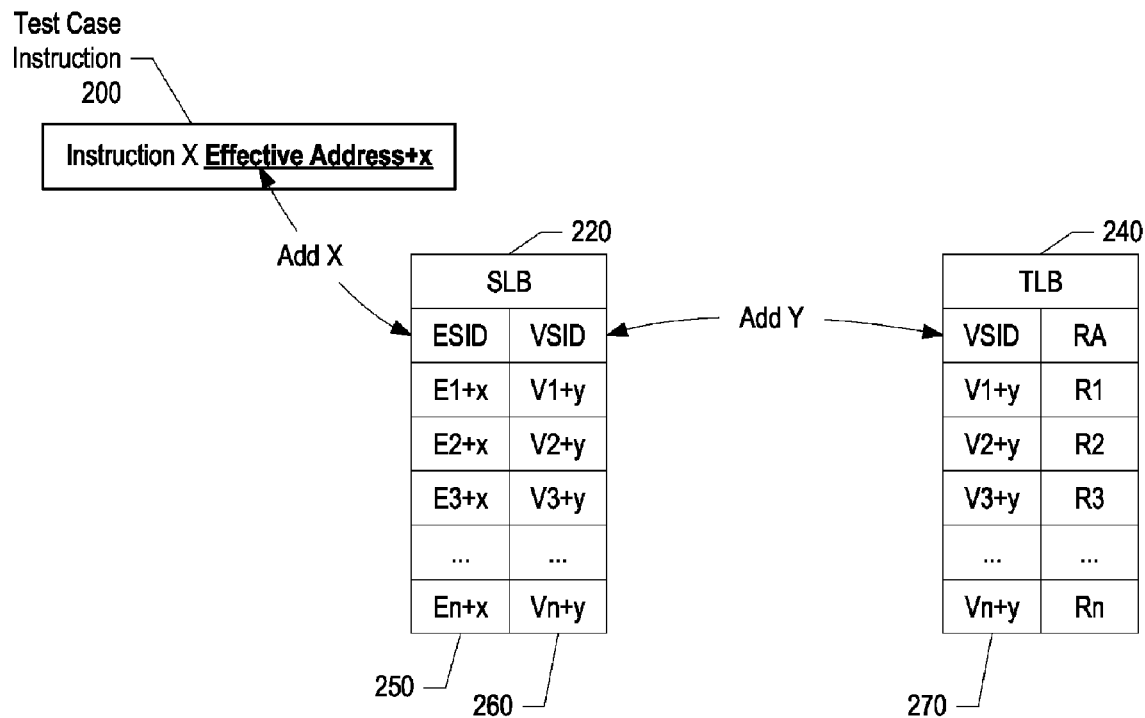
FIG. 2B is a diagram showing results of an effective address (EA) arithmetic function and a virtual address (VA) arithmetic function modifying test case effective addresses, ESIDs, and VSIDs.

FIG. 2B is a diagram showing results of an effective address (EA) arithmetic function and a virtual address (VA) arithmetic function modifying test case effective addresses, ESIDs, and VSIDs. Compared with FIG. 2A, EA arithmetic function 210 increases test case instruction 200's effective address by "x," as well as each ESID entry in SLB 200 (column 250). And, VA arithmetic function 230 increases each VSID entry in SLB 200 (column 260) and each VSID entry in TLB 240 (column 270) by "y."

Figure 3:
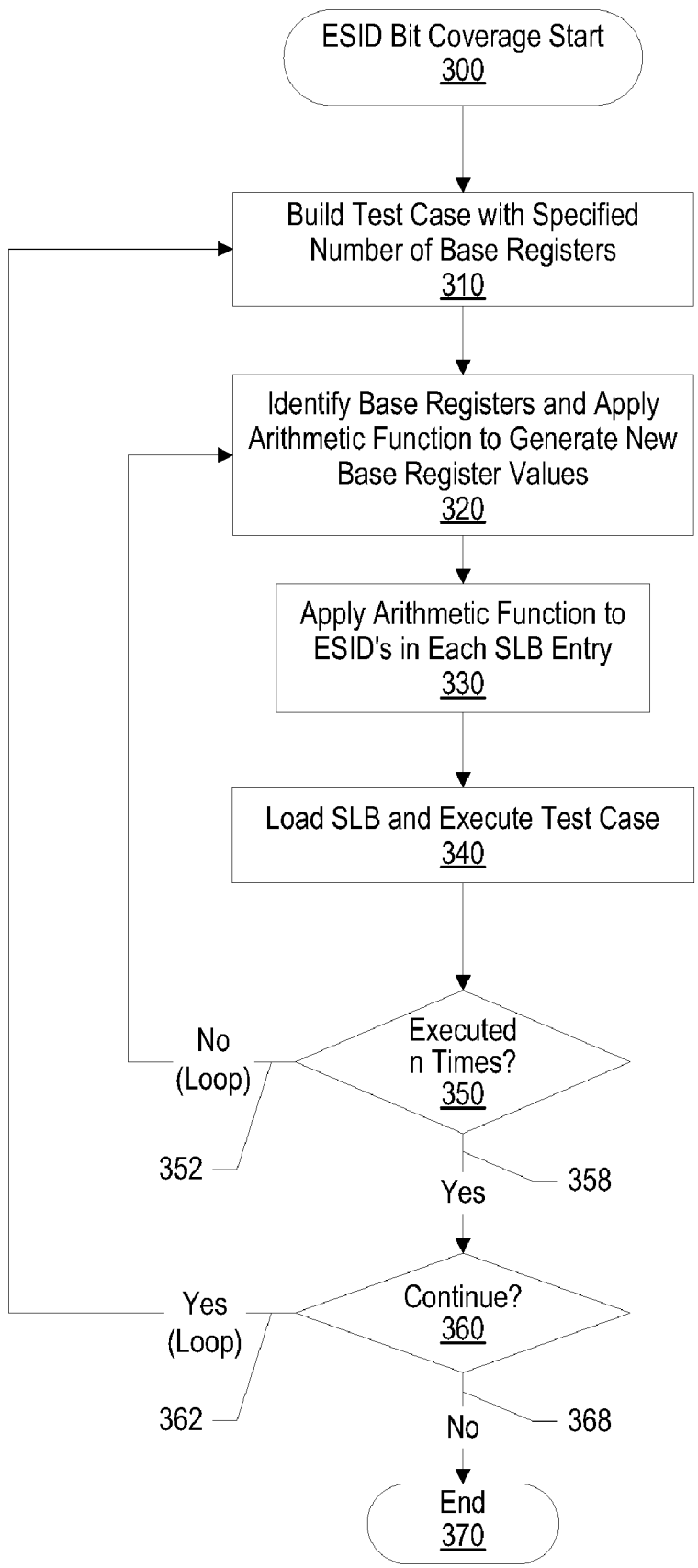
FIG. 3 is a flowchart showing steps taken in using an effective address (EA) arithmetic function to modify test case effective addresses and ESIDs.

FIG. 3 is a flowchart showing steps taken in using an effective address (EA) arithmetic function to modify test case effective addresses and ESIDs. Processing commences at 300, whereupon processing builds a test case with a specified number of test case base address registers (step 310). At step 320, processing identifies the base registers and applies the EA arithmetic function to their base register values in order to generate new values.

Processing then applies the same EA arithmetic function to the ESID entries located in a segment lookaside buffer (SLB) at step 330. Next, processing loads the SLB and executes the test case using the modified test case base address register values and the modified ESIDs that are included in the SLB.

Figure 4:
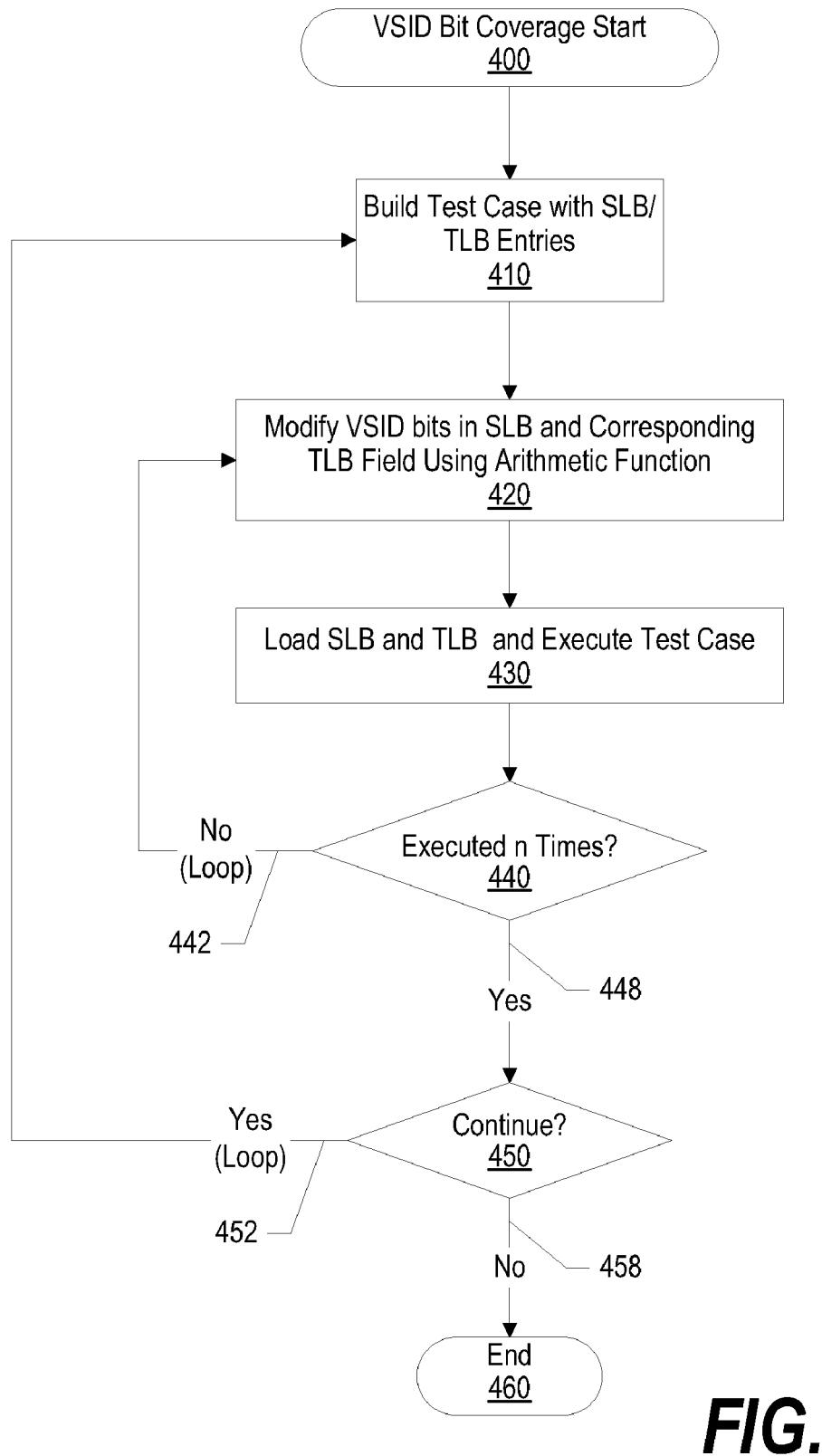
FIG. 4 is a flowchart showing steps taken in using a virtual address (VA) arithmetic function to modify virtual segment identifiers (VSIDs) in a segment lookaside buffer (SLB) and a translation lookaside buffer (TLB)

In one embodiment, processing also modifies virtual segment identifiers prior to executing the test case (see FIG. 4 and corresponding text for further details). In another embodiment, processing executes the test case for the first time using initial test case base address register values and initial ESIDs.

A determination is made as to whether the test case has been executed "n" number of times using different sets of test case base address register values and different sets of ESIDs (decision 350). If the test case has not executed "n" number of times, decision 350 branches to "No" branch 352, which loops back to modify the test case base address register values and the ESIDs, and re-execute the test case. This looping continues until the test case has executed "n" times, at which point decision 350 branches to "Yes" branch 358.

A determination is made as to whether to continue to test the processor using a different test case (decision 360). If processing should continue, decision 360 branches to "Yes" branch 362, which loops back to build a new test case. This looping continues until processing should terminate, at which point decision 360 branches to "No" branch 368, whereupon processing ends at 370.

FIG. 4 is a flowchart showing steps taken in using a virtual address (VA) arithmetic function to modify virtual segment identifiers (VSIDs) in a segment lookaside buffer (SLB) and a translation lookaside buffer (TLB). Processing commences at 400, whereupon processing builds a test case with SLB entries (for translating effective addresses to virtual addresses) and TLB entries (for translating virtual addresses to real addresses) (step 410). At step 420, processing modifies VSID bits in the SLB and the TLB using the VA arithmetic function. Next, processing loads the SLB and the TLB, and executes the test case using the modified SLB and TLB at step 430.

In one embodiment, processing also modifies effective segment identifiers prior to executing the test case (see FIG. 3 and corresponding text for further details). In another embodiment, processing executes the test case for the first time using initial VSIDs.

A determination is made as to whether the test case has been executed "n" number of times using different sets of VSIDs (decision 440). If the test case has not executed "n" number of times, decision 440 branches to "No" branch 442, which loops back to modify the VSIDs, and re-execute the test case. This looping continues until the test case has executed "n" times, at which point decision 440 branches to "Yes" branch 448.

A determination is made as to whether to continue to test the processor using a different test case (decision 450). If processing should continue, decision 450 branches to "Yes" branch 452, which loops back to build a new test case. This looping continues until processing should terminate, at which point decision 450 branches to "No" branch 458, whereupon processing ends at 460.

Figure 5:
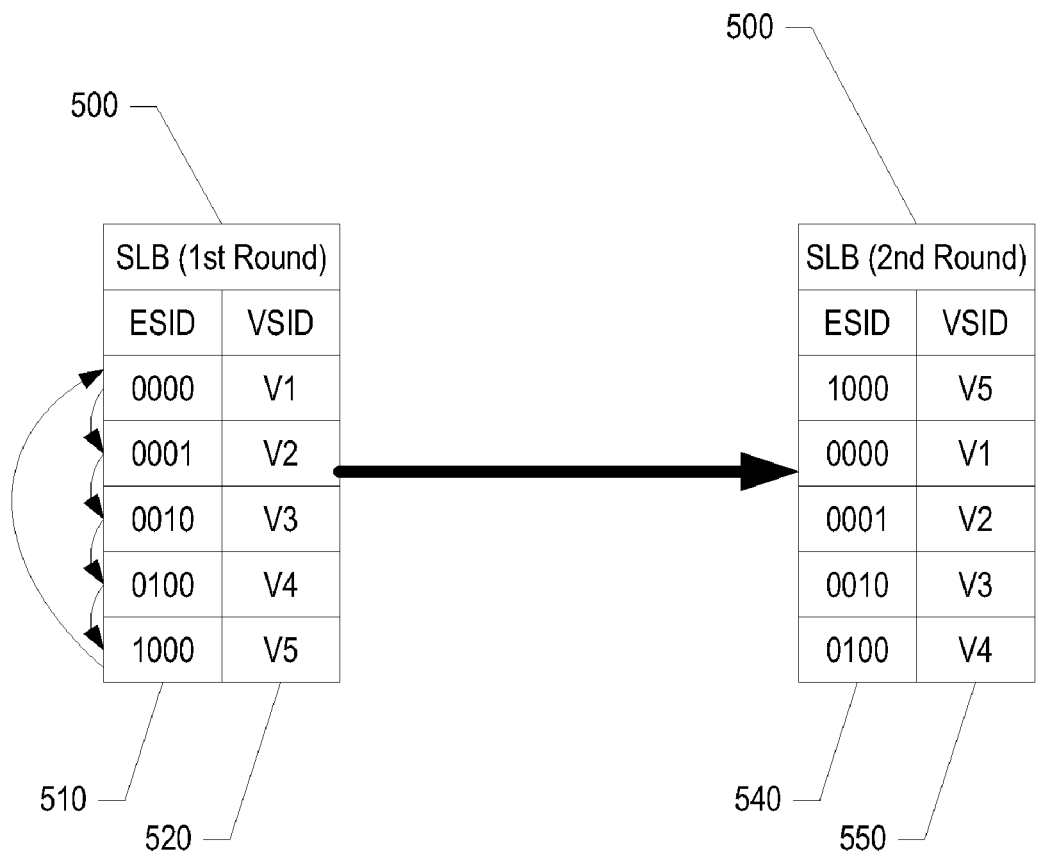
FIG. 5 is a diagram showing the invention described herein sequentially shifting segment lookaside buffer (SLB) entries, whose ESIDs are in single bit increments, in order to fully test each ESID bit location within each SLB entry.

FIG. 5 is a diagram showing the invention described herein sequentially shifting segment lookaside buffer (SLB) entries, whose ESIDs are in single bit increments, in order to fully test each ESID bit location within each SLB entry. When a test case generator builds SLB 500, the test case generator builds multiple SLB entries in such a way that each ESID bit position is set and unset at least once in any of the entries (shown in column 510). A test case executor then executes the test case using SLB 500 during a first execution round.

Next, the test case executor's scheduler shifts each ESID/VSID pair down one entry. As a result, at least one ESID bit in each of the SLB entries is different from the first execution round (column 540). As can be seen, since ESID/VSID pairs are shifted, the pair combination does not change from columns 510 and 520 to columns 540 and 550. In one embodiment, the scheduler pseudo-randomly shuffles the ESID/VSID pairs, all the while keeping the pair combination intact. The test case executor then executes the test case using the modified SLB during a second execution round (see FIG. 6 and corresponding text for further details).

Figure 6:
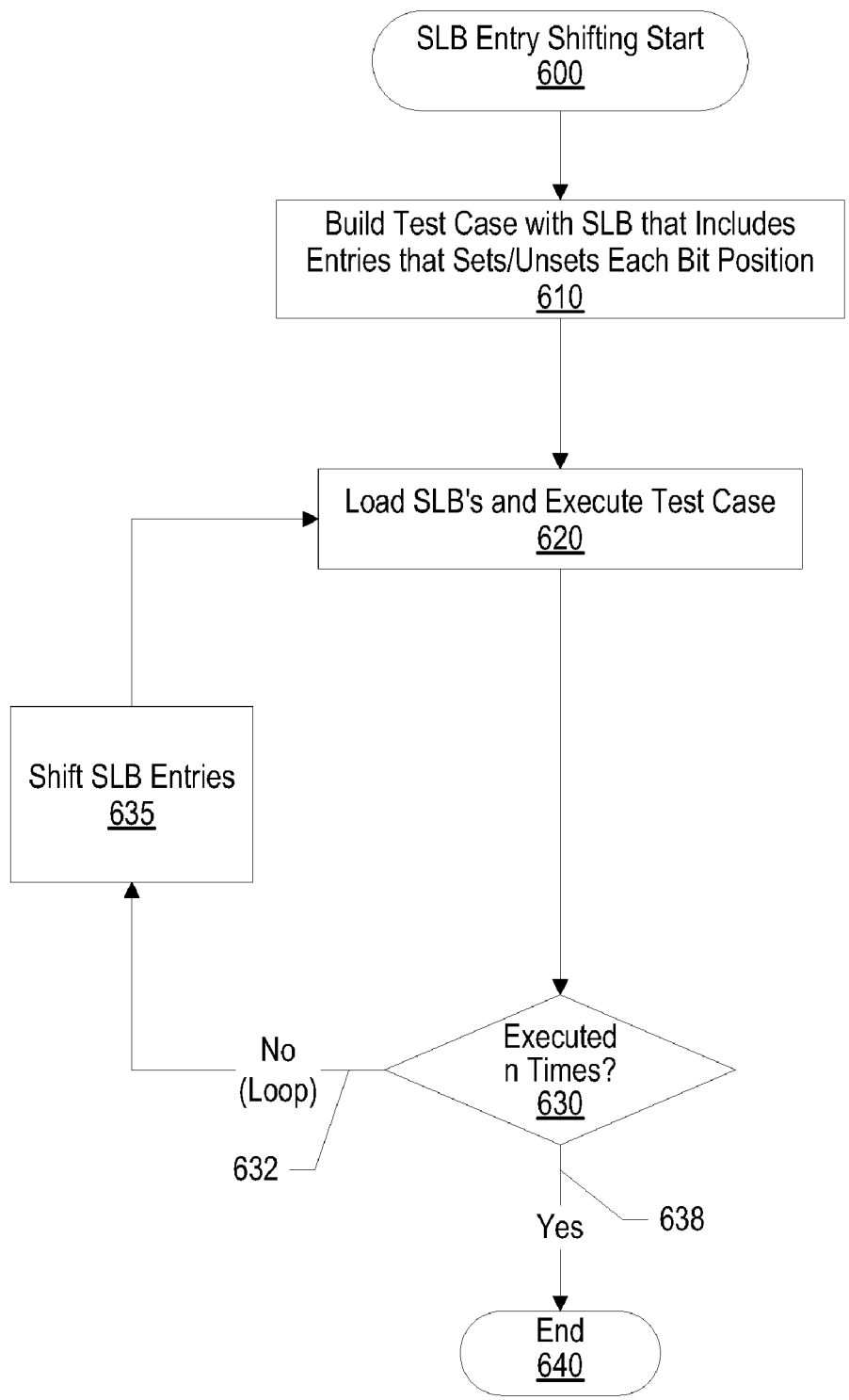
FIG. 6 is a flowchart showing steps taken in sequentially shifting segment lookaside buffer entries, whose ESIDs are in single bit increments, in order to fully test each ESID bit location within each SLB entry.

FIG. 6 is a flowchart showing steps taken in sequentially shifting segment lookaside buffer entries, whose ESIDs are in single bit increments, in order to fully test each ESID bit location within each SLB entry. Processing commences at 600, whereupon processing builds a test case with an SLB that includes SLB entries that sets/unsets each ESID bit position (step 610). At step 620, processing loads the SLB and executes the test case.

Once the test case finishes executing, and passes, a determination is made as to whether the test case has been executed "n" number of times to shift each ESID/VSID pair through each SLB entry (decision 630). If the test case has not executed "n" number of times, decision 630 branches to "No" branch 632, which loops back to shift the ESID/VSID pairs (step 635), and re-execute the test case. In one embodiment, the scheduler pseudo-randomly shuffles the ESID/VSID pairs, all the while keeping the pair combination intact. This looping continues until the test case has executed "n" times, at which point decision 630 branches to "Yes" branch 638, whereupon processing ends at 640.

Figure 7:
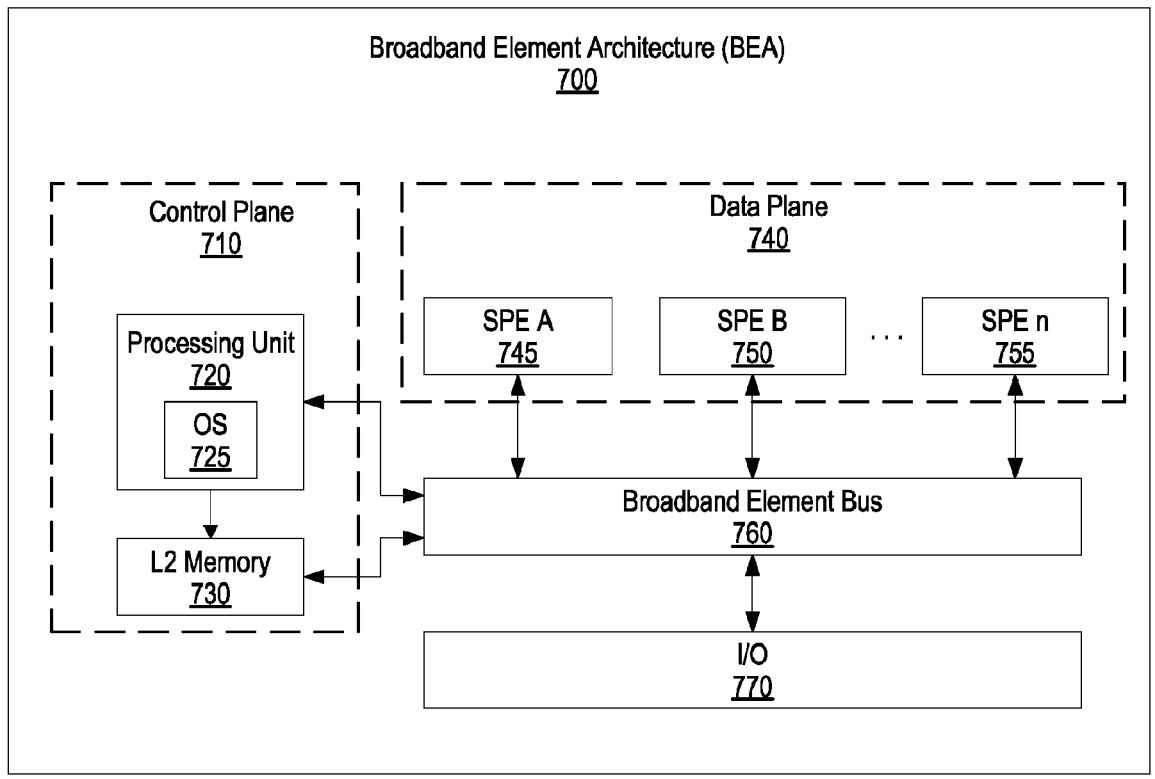
FIG. 7 is a diagram showing a broadband element architecture which includes a plurality of heterogeneous processors capable of implementing the invention described herein.

FIG. 7 is a diagram showing a broadband element architecture which includes a plurality of heterogeneous processors capable of implementing the invention described herein. The heterogeneous processors share a common memory and a common bus. Broadband element architecture (BEA) 700 sends and receives information to/from external devices through input output 770, and distributes the information to control plane 710 and data plane 740 using processor element bus 760. Control plane 710 manages BEA 700 and distributes work to data plane 740.

Control plane 710 includes processing unit 720 which runs operating system (OS) 725. For example, processing unit 720 may be a Power PC core that is embedded in BEA 700 and OS 725 may be a Linux operating system. Processing unit 720 manages a common memory map table for BEA 700. The memory map table corresponds to memory locations included in BEA 700, such as L2 memory 730 as well as non-private memory included in data plane 740.

Data plane 740 includes Synergistic processing element's (SPE) 745, 750, and 755. Each SPE is used to process data information and each SPE may have different instruction sets. For example, BEA 700 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU) which is a processing core, such as a digital signal processor, a microcontroller, a microprocessor, or a combination of these cores.

SPE 745, 750, and 755 are connected to processor element bus 760, which passes information between control plane 710, data plane 740, and input/output 770. Bus 760 is an on-chip coherent multi-processor bus that passes information between I/O 770, control plane 710, and data plane 740. Input/output 770 includes flexible input-output logic which dynamically assigns interface pins to input output controllers based upon peripheral devices that are connected to BEA 700.

Figure 8:
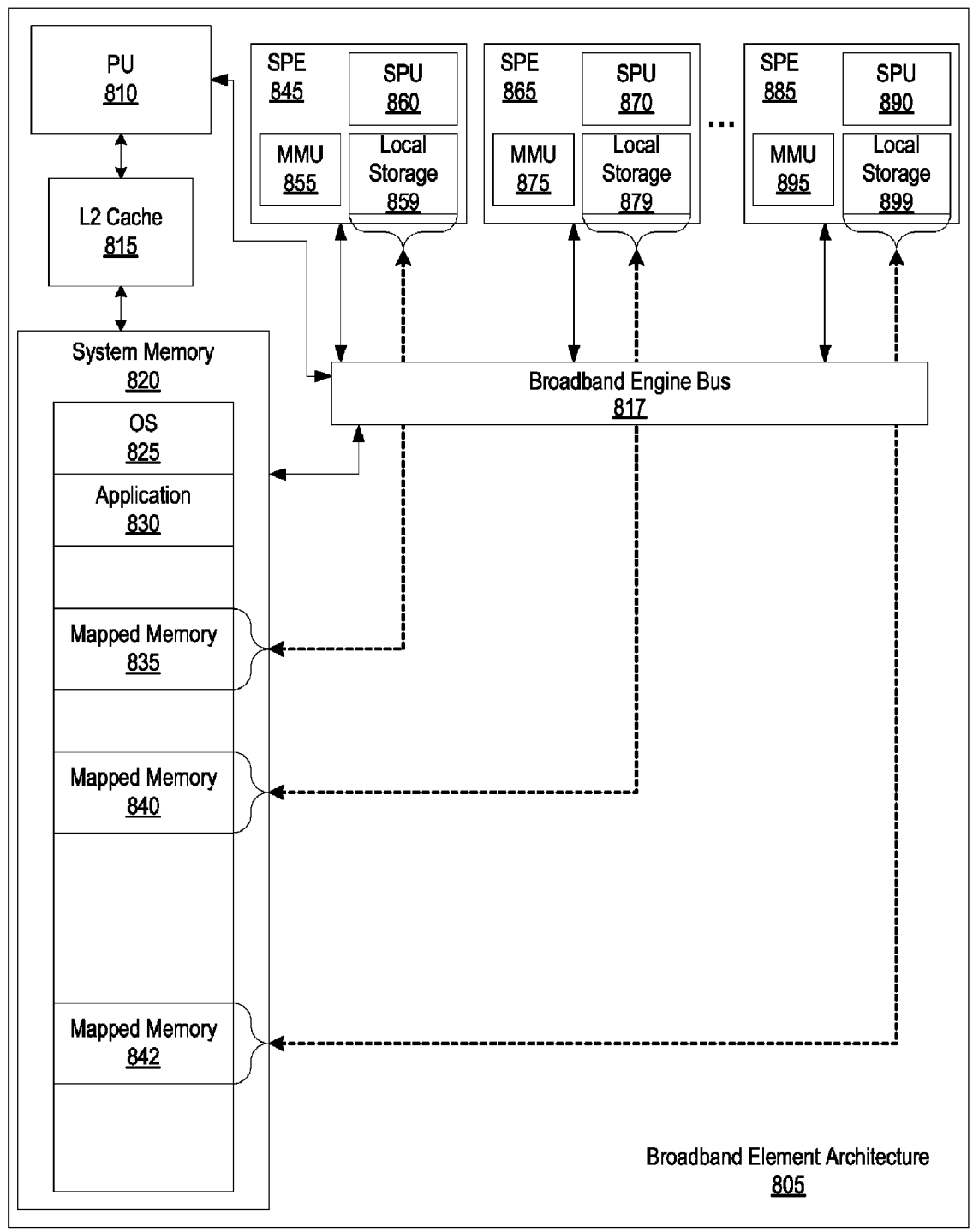
FIG. 8 is a block diagram illustrating a processing element having a main processor and a plurality of secondary processors sharing a system memory.

FIG. 8 is a block diagram illustrating a processing element having a main processor and a plurality of secondary processors sharing a system memory. Broadband Element Architecture (BEA) 805 includes processing unit (PU) 810, which, in one embodiment, acts as the main processor and runs the operating system. Processing unit 810 may be, for example, a Power PC core executing a Linux operating system. BEA 805 also includes a plurality of synergistic processing elements (SPEs) such as SPEs 845 through 885. Each SPE includes a synergistic processing unit (SPU) that act as secondary processing units to PU 810, a memory storage unit, and local storage. For example, SPE 845 includes SPU 860, MMU 855, and local storage 859; SPE 865 includes SPU 870, MMU 875, and local storage 879; and SPE 885 includes SPU 890, MMU 895, and local storage 899.

In one embodiment, the SPEs process data under the control of PU 810. The SPEs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 810 and by the other SPEs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPE may be set up to perform a different task, and accordingly, in one embodiment, each SPE may be accessed using different instruction sets. If BEA 805 is being used in a wireless communications system, for example, each SPE may be responsible for separate processing tasks, such as modulation, chip rate processing, encoding, network interfacing, etc. In another embodiment, each SPE may have identical instruction sets and may be used in parallel to perform operations benefiting from parallel processes.

The shared portion of the SPEs' local stores may be accessed by PU 810 as well as by the other SPEs by mapping each shared region to system memory 820. In one embodiment, PU 810 manages the memory map for the common system memory 820. The memory map table may include PU 810's L2 Cache 815, system memory 820, as well as the SPEs' shared local stores.

A portion of system memory 820 as shown is occupied by the operating system (OS 825). System Memory 825 also contains data 840, which represents data to be processed by SPU 810 as well as by the SPEs. In one embodiment, a process executing on the PU receives a request for a task involving the processing of large data. The PU first determines an optimum method for performing the task as well as an optimum placement of the data in common system memory 820. The PU may then initiate a transfer of the data to be processed from disk 835 to system memory 820. In one embodiment, the PU arranges the data in system memory 825 in data blocks the size of the registers of the SPEs. In one embodiment, the SPEs may have 128 registers, each register being 128 bits long.

The PU then searches for available SPEs and assigns blocks of data to any available SPEs for processing of the data. The SPEs can access the common system memory (through a DMA command, for example) transfer the data to the SPEs' local store, and perform the assigned operations. After processing the data, the SPEs may transfer the data (using DMA again, for example) back to common system memory 820. This procedure may be repeated as SPEs become available until all the data blocks have been processed.

Figure 9:
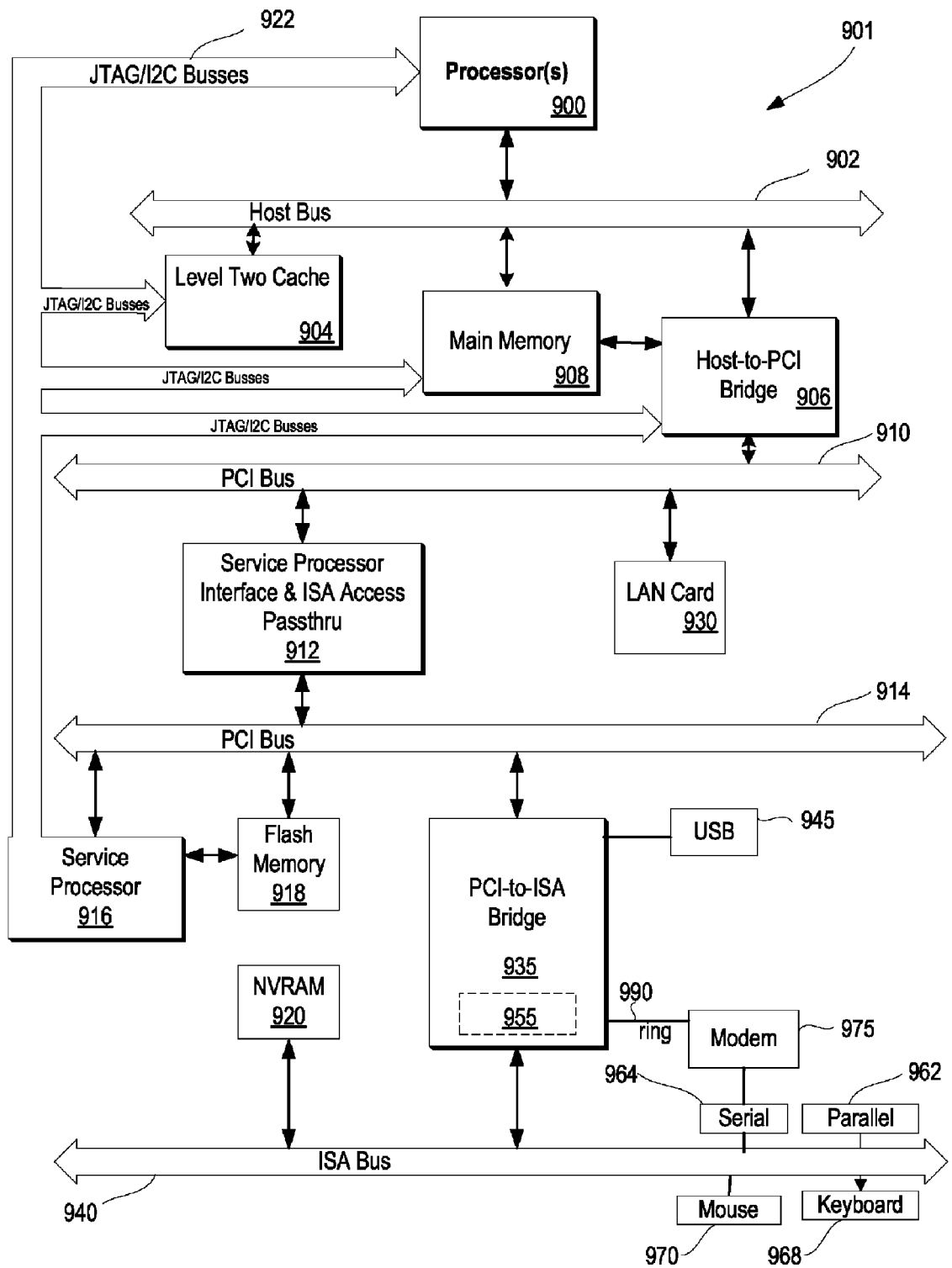
FIG. 9 is a block diagram of a computing device capable of implementing the present invention.

FIG. 9 illustrates information handling system 901 which is a simplified example of a computer system capable of performing the computing operations described herein. Computer system 901 includes processor 900 which is coupled to host bus 902. A level two (L2) cache memory 904 is also coupled to host bus 902. Host-to-PCI bridge 906 is coupled to main memory 908, includes cache memory and main memory control functions, and provides bus control to handle transfers among PCI bus 910, processor 900, L2 cache 904, main memory 908, and host bus 902. Main memory 908 is coupled to Host-to-PCI bridge 906 as well as host bus 902. Devices used solely by host processor(s) 900, such as LAN card 930, are coupled to PCI bus 910. Service Processor Interface and ISA Access Pass-through 912 provides an interface between PCI bus 910 and PCI bus 914. In this manner, PCI bus 914 is insulated from PCI bus 910. Devices, such as flash memory 918, are coupled to PCI bus 914. In one implementation, flash memory 918 includes BIOS code that incorporates the necessary processor executable code for a variety of low-level system functions and system boot functions.

PCI bus 914 provides an interface for a variety of devices that are shared by host processor(s) 900 and Service Processor 916 including, for example, flash memory 918. PCI-to-ISA bridge 935 provides bus control to handle transfers between PCI bus 914 and ISA bus 940, universal serial bus (USB) functionality 945, power management functionality 955, and can include other functional elements not shown, such as a real-time clock (RTC), DMA control, interrupt support, and system management bus support. Nonvolatile RAM 920 is attached to ISA Bus 940. Service Processor 916 includes JTAG and I2C busses 922 for communication with processor(s) 900 during initialization steps. JTAG/I2C busses 922 are also coupled to L2 cache 904, Host-to-PCI bridge 906, and main memory 908 providing a communications path between the processor, the Service Processor, the L2 cache, the Host-to-PCI bridge, and the main memory. Service Processor 916 also has access to system power resources for powering down information handling device 901.

Peripheral devices and input/output (I/O) devices can be attached to various interfaces (e.g., parallel interface 962, serial interface 964, keyboard interface 968, and mouse interface 970 coupled to ISA bus 940. Alternatively, many I/O devices can be accommodated by a super I/O controller (not shown) attached to ISA bus 940.

In order to attach computer system 901 to another computer system to copy files over a network, LAN card 930 is coupled to PCI bus 910. Similarly, to connect computer system 901 to an ISP to connect to the Internet using a telephone line connection, modem 995 is connected to serial port 964 and PCI-to-ISA Bridge 935.

While FIG. 9 shows one information handling system that employs processor(s) 900, the information handling system may take many forms. For example, information handling system 901 may take the form of a desktop, server, portable, laptop, notebook, or other form factor computer or data processing system. Information handling system 901 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   receiving a test case that includes a first set of test case effective addresses, a first set of effective segment identifiers, and a first set of virtual segment identifiers;
   executing the test case using the first set of test case effective addresses, the first set of effective segment identifiers, and the first set of virtual segment identifiers;
   modifying the first set of test case effective addresses and the first set of effective segment identifiers using an effective address arithmetic function, resulting in a second set of test case effective addresses and a second set of effective segment identifiers;
   modifying the first set of virtual segment identifiers using a virtual address arithmetic function, resulting in a second set of virtual segment identifiers; and
   re-executing, by a processor, the test case using the second set of test case effective addresses, the second set of effective segment identifiers, and the second set of virtual segment identifiers.

2. The method of claim 1 wherein the first set of effective segment identifiers reside in a segment lookaside buffer, and wherein the first set of virtual segment identifiers reside in the segment lookaside buffer and a translation lookaside buffer.

3. The method of claim 2 wherein each of the effective segment identifiers included in the first set of effective segment identifiers corresponds to one of the virtual segment identifiers included in the first set of virtual segment identifiers.

4. The method of claim 1 wherein modifying the first set of test case effective addresses further comprises regenerating one or more test case base register values using the effective address arithmetic function.

5. The method of claim 1 wherein the effective address arithmetic function modifies only one bit position in each of the test case effective addresses included in the first set of test case effective addresses, and modifies the same bit position in each of the effective segment identifiers included in the first set of effective segment identifiers; and
   wherein the virtual address arithmetic function modifies only one bit position in each of the virtual segment identifiers included in the first set of virtual segment identifiers that are located in a segment lookaside buffer and a translation lookaside buffer.

6. The method of claim 1 wherein the first set of effective segment identifiers and the first set of virtual segment identifiers comprise a plurality of effective segment identifier/virtual segment identifier pairs within a segment lookaside buffer, each of the plurality of effective segment identifier/virtual segment identifier pairs included in a segment lookaside buffer entry, the method further comprising:
   shifting each of the plurality of effective segment identifier/virtual segment identifier pairs to a different segment lookaside buffer entry; and
   after the shifting, re-executing the test case.

7. The method of claim 1 wherein the first set of effective segment identifiers and the first set of virtual segment identifiers comprise a plurality of effective segment identifier/virtual segment identifier pairs within a segment lookaside buffer, each of the plurality of effective segment identifier/virtual segment identifier pairs included in a segment lookaside buffer entry, the method further comprising:
   pseudo-randomly placing each of the plurality of effective segment identifier/virtual segment identifier pairs into to a different segment lookaside buffer entry; and
   after the pseudo-random placement, re-executing the test case.

8. An information handling system comprising:
   one or more processors;
   a memory accessible by the processors;
   one or more nonvolatile storage devices accessible by the processors; and
   a set of instructions stored in the memory, wherein one or more of the processors executes the set of instructions in order to perform actions of:
      receiving a test case that includes a first set of test case effective addresses, a first set of effective segment identifiers, and a first set of virtual segment identifiers;
      executing the test case using the first set of test case effective addresses, the first set of effective segment identifiers, and the first set of virtual segment identifiers;
      modifying the first set of test case effective addresses and the first set of effective segment identifiers using an effective address arithmetic function, resulting in a second set of test case effective addresses and a second set of effective segment identifiers;
      modifying the first set of virtual segment identifiers using a virtual address arithmetic function, resulting in a second set of virtual segment identifiers; and re-executing the test case using the second set of test case effective addresses, the second set of effective segment identifiers, and the second set of virtual segment identifiers.

9. The information handling system of claim 8 wherein the first set of effective segment identifiers reside in a segment lookaside buffer, and wherein the first set of virtual segment identifiers reside in the segment lookaside buffer and a translation lookaside buffer.

10. The information handling system of claim 9 wherein each of the effective segment identifiers included in the first set of effective segment identifiers corresponds to one of the virtual segment identifiers included in the first set of virtual segment identifiers.

11. The information handling system of claim 8 wherein modifying the first set of test case effective addresses further comprises regenerating one or more test case base register values using the effective address arithmetic function.

12. The information handling system of claim 8 further comprising an additional set of instructions in order to perform actions of:
wherein the effective address arithmetic function modifies only one bit position in each of the test case effective addresses included in the first set of test case effective addresses, and modifies the same bit position in each of the effective segment identifiers included in the first set of effective segment identifiers; and
wherein the virtual address arithmetic function modifies only one bit position in each of the virtual segment identifiers included in the first set of virtual segment identifiers that are located in a segment lookaside buffer and a translation lookaside buffer.

13. The information handling system of claim 8 wherein the first set of effective segment identifiers and the first set of virtual segment identifiers comprise a plurality of effective segment identifier/virtual segment identifier pairs within a segment lookaside buffer, each of the plurality of effective segment identifier/virtual segment identifier pairs included in a segment lookaside buffer entry, the information handling system further comprising an additional set of instructions in order to perform actions of:
shifting each of the plurality of effective segment identifier/virtual segment identifier pairs to a different segment lookaside buffer entry; and
after the shifting, re-executing the test case.

14. The information handling system of claim 8 wherein the first set of effective segment identifiers and the first set of virtual segment identifiers comprise a plurality of effective segment identifier/virtual segment identifier pairs within a segment lookaside buffer, each of the plurality of effective segment identifier/virtual segment identifier pairs included in a segment lookaside buffer entry, the information handling system further comprising an additional set of instructions in order to perform actions of:
pseudo-randomly placing each of the plurality of effective segment identifier/virtual segment identifier pairs into to a different segment lookaside buffer entry; and
after the pseudo-random placement, re-executing the test case.

15. A computer program product stored on a computer operable media non-transitory, the computer operable media containing instructions for execution by a computer, which, when executed by the computer, cause the computer to implement a method of processing test patterns, the method comprising:
receiving a test case that includes a first set of test case effective addresses, a first set of effective segment identifiers, and a first set of virtual segment identifiers;
executing the test case using the first set of test case effective addresses, the first set of effective segment identifiers, and the first set of virtual segment identifiers;
modifying the first set of test case effective addresses and the first set of effective segment identifiers using an effective address arithmetic function, resulting in a second set of test case effective addresses and a second set of effective segment identifiers;
modifying the first set of virtual segment identifiers using a virtual address arithmetic function, resulting in a second set of virtual segment identifiers; and
re-executing the test case using the second set of test case effective addresses, the second set of effective segment identifiers, and the second set of virtual segment identifiers.

16. The computer program product of claim 15 wherein the first set of effective segment identifiers reside in a segment lookaside buffer, and wherein the first set of virtual segment identifiers reside in the segment lookaside buffer and a translation lookaside buffer.

17. The computer program product of claim 16 wherein each of the effective segment identifiers included in the first set of effective segment identifiers corresponds to one of the virtual segment identifiers included in the first set of virtual segment identifiers.

18. The computer program product of claim 15 wherein modifying the first set of test case effective addresses further comprises regenerating one or more test case base register values using the effective address arithmetic function.

19. The computer program product of claim 15 wherein the method further comprises:
wherein the effective address arithmetic function modifies only one bit position in each of the test case effective addresses included in the first set of test case effective addresses, and modifies the same bit position in each of the effective segment identifiers included in the first set of effective segment identifiers; and
wherein the virtual address arithmetic function modifies only one bit position in each of the virtual segment identifiers included in the first set of virtual segment identifiers that are located in a segment lookaside buffer and a translation lookaside buffer.

20. The computer program product of claim 15 wherein the first set of effective segment identifiers and the first set of virtual segment identifiers comprise a plurality of effective segment identifier/virtual segment identifier pairs within a segment lookaside buffer, each of the plurality of effective segment identifier/virtual segment identifier pairs included in a segment lookaside buffer entry, the method further comprising:
shifting each of the plurality of effective segment identifier/virtual segment identifier pairs to a different segment lookaside buffer entry; and
after the shifting, re-executing the test case.

* * * * *